United States Patent [19]

Goodlander et al.

[11] Patent Number: 4,942,579
[45] Date of Patent: Jul. 17, 1990

[54] HIGH-SPEED, HIGH-CAPACITY, FAULT-TOLERANT ERROR-CORRECTING STORAGE SYSTEM

[75] Inventors: Theodore J. Goodlander; Jose M. Valdepenas; Ricardo E. V. McCaskey; Gerardo Vizcaino, all of Nashua, N.H.

[73] Assignee: Cab-Tek, Inc., Nashua, N.H.

[21] Appl. No.: 317,048

[22] Filed: Feb. 27, 1989

Related U.S. Application Data

[63] Continuation of Ser. No. 57,346, Jun. 2, 1987, abandoned.

[51] Int. Cl.⁵ .................. G06F 11/10; G06F 11/16
[52] U.S. Cl. .................. 371/51; 364/246.4; 364/266.3; 364/268.5; 371/10.1
[58] Field of Search .................. 371/38, 51, 66, 10.1, 371/40.1, 40.2, 40.3, 40.4, 51.1; 364/200 MS File

[56] References Cited

U.S. PATENT DOCUMENTS

| | | | |
|---|---|---|---|
| 3,876,978 | 4/1975 | Bossen et al. | 371/51 |
| 4,228,496 | 10/1980 | Katzman et al. | 364/200 |
| 4,410,942 | 10/1983 | Milligan et al. | 364/200 |
| 4,644,545 | 2/1987 | Gershenson | 371/38 |
| 4,722,085 | 1/1988 | Flora et al. | 371/38 |
| 4,761,785 | 8/1988 | Clark et al. | 371/51.1 X |
| 4,849,978 | 7/1989 | Dishon et al. | 371/51.1 X |

OTHER PUBLICATIONS

Kim, "Synchronized Disk Interleaving", IEEE Trans. on Computers, vol. C-35, No. 11, Nov. 1986.

Primary Examiner—Jerry Smith
Assistant Examiner—Stephen M. Baker
Attorney, Agent, or Firm—Davis, Bujold & Streck

[57] ABSTRACT

A storage system for dynamic and trasparent error correction has a number of first individual storage devices for information and a second individual storage device for error code bits that are used to correct the information when one of the storage devices detects an error. Each error code bit is generated from the information at respective bit positions across the first storage devices. Storage device controllers are connected between a user CPU interface and respective storage devices for operating them concurrently. The interface includes an interface CPU for controlling the storage device controllers and translating the interface convention of user CPU requests into the interface convention of the storage devices. A buffer memory is connected to data surface associated with the respective storage devices. The interface CPU includes logic for immediately acknowledging a write to the associated storage device upon the data being placed in the buffer memory. The interface CPU also includes logic for checking data in the buffer memory and indicating it as having been read from an associated storage device without an actual read, whereby the buffer memory acts as a cache.

9 Claims, 5 Drawing Sheets

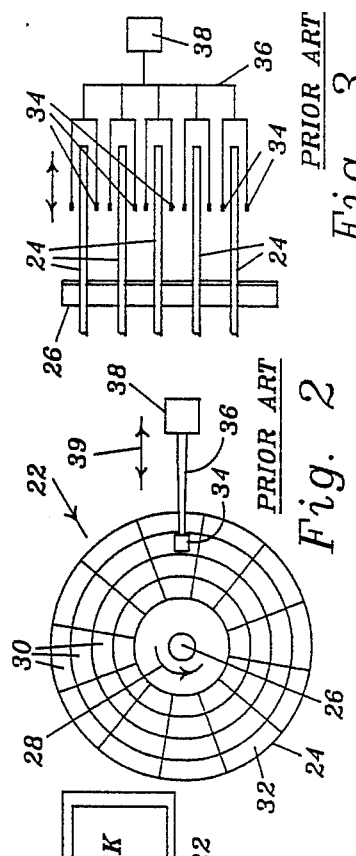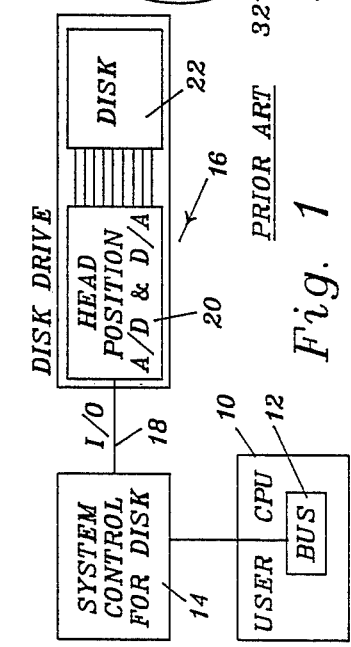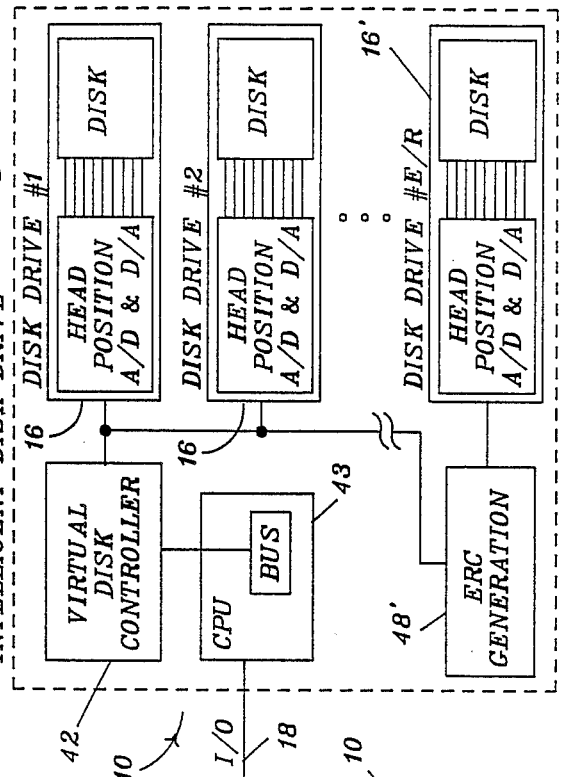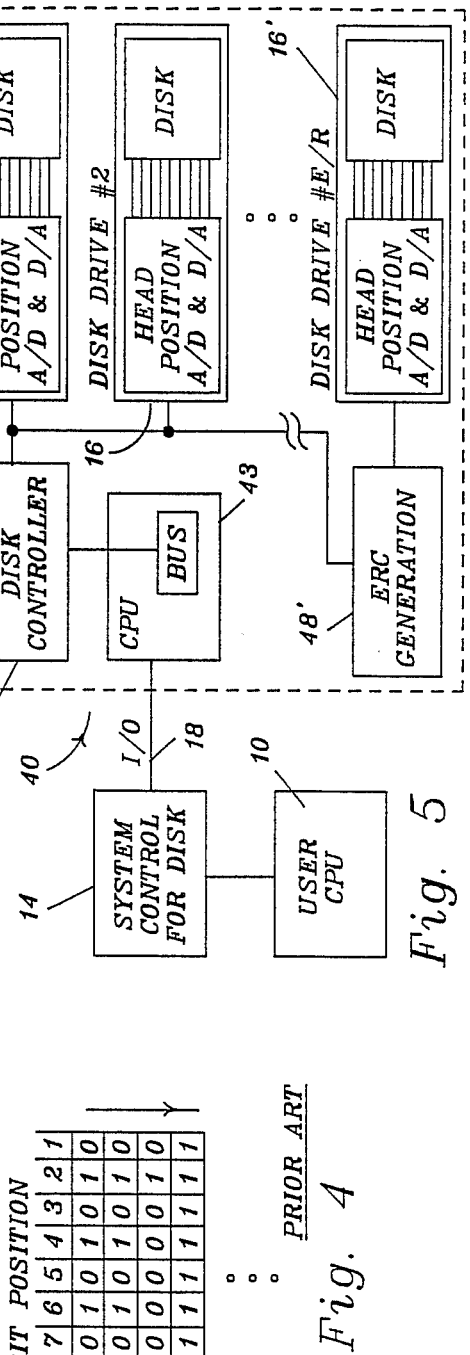

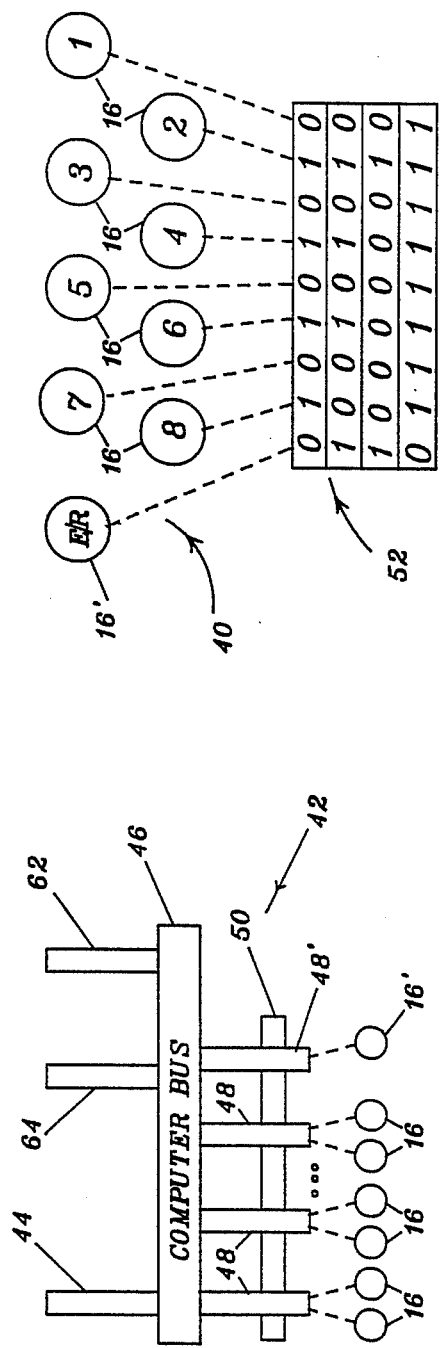
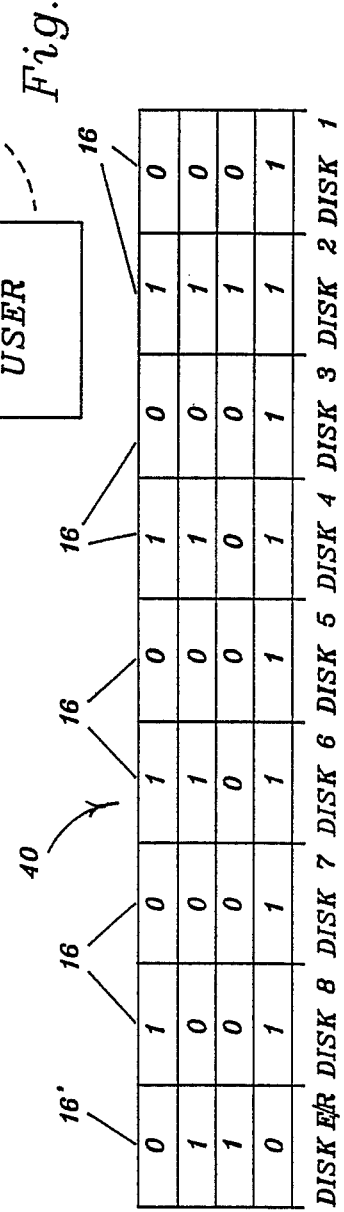

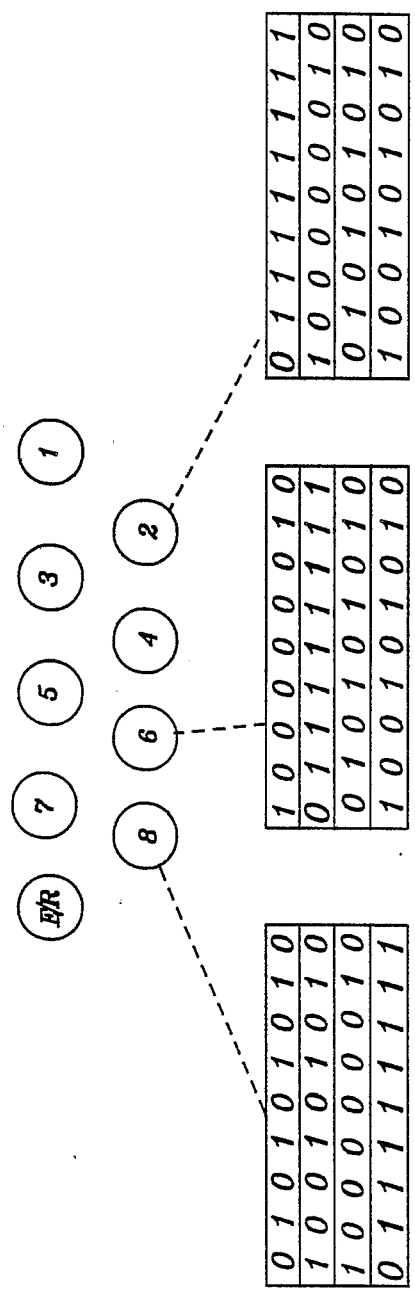

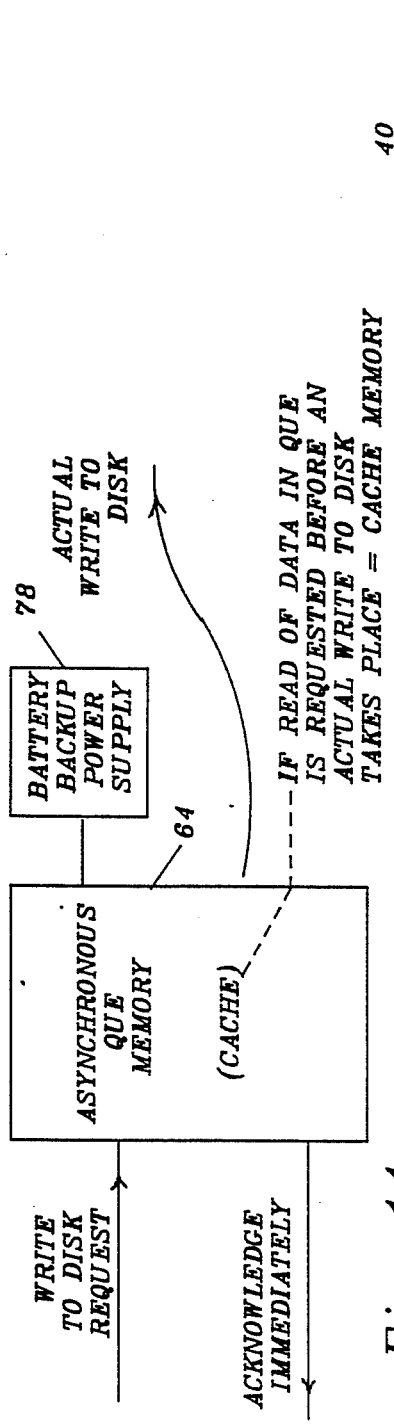
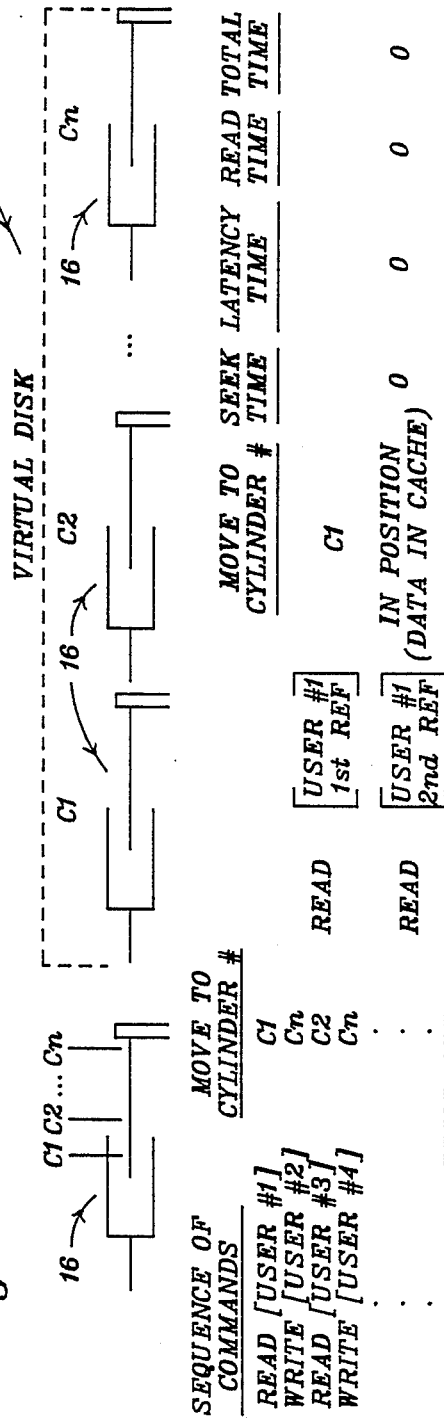
Fig. 14
Fig. 12 PRIOR ART
Fig. 13

HIGH-SPEED, HIGH-CAPACITY, FAULT-TOLERANT ERROR-CORRECTING STORAGE SYSTEM

This is a continuation of co-pending application Ser. No. 07/057,346 filed on June 2, 1987, now abandoned.

BACKGROUND OF THE INVENTION:

The present invention relates to mass storage devices for use with computers such as disk drives, and the like, and, more particularly, to a storage device system for computers capable of dynamically and transparently reconstructing lost data comprising, a plurality of first individual storage devices for storing digital information; a second individual storage device for storing error/recovery code bits; means for generating and storing error/recovery code bits in the second individual storage device according to a pre-defined parity checking algorithm for the digital information at corresponding respective bit positions across the plurality of first individual storage devices; and, means for using the error/recovery code bits in combination with the contents of the corresponding respective bit positions across the plurality of first individual storage devices to reconstruct a changed bit in error in the digital information according to the parity checking algorithm when one of the first and second individual storage devices detects an error during the transfer of the digital information.

As described herein, the present invention is primarily directed to disk drives as used for mass storage with computers. As those skilled in the art will recognize, the benefits thereof can also be used to advantage with other mass storage devices presently available, others presently under development and commercialization (such as optical disks, high density RAM arrays, bubble memories, and the like), and others as yet not even thought of. Accordingly, while the term "disk drive" will be used extensively hereinafter and the drawing figures show the present invention employed in conjunction with disk drives, it is applicant's intent that the scope and spirit afforded this application and the claims appended thereto be of a breadth encompassing such other devices even though not specifically described or shown herein.

In the present state of computer technology, disk drives of the so-called "Winchester" variety, and the like, are the primary devices employed for mass storage of programs and data. Because of their low cost, they will probably remain in wide use in the future even in the presence of more exotic devices being commercially available.

Prior art disk drives generally operate in the manner shown in FIGS. 1-4. As shown in FIG. 1, the using CPU 10 is typically connected to a BUS 12 which, in turn, is connected to, among other things, a non-intelligent system disk controller 14 for inputting to and outputting from an equally non-intelligent disk drive generally indicated as 16. The controller 14 and disk drive 16 are said to be non-intelligent in that, generally, they only do what they are asked by the user CPU 10. The disk drive 16 is connected to the controller 14 by I/O cable 18. Within the disk drive 16, there is a mechanical/electronic drive assembly 20 which positions the heads of the disk drive, does analog to digital conversion, digital to analog conversion, etc., as necessary to read and write to the storage disk 22 itself. This process is shown in more detail in FIGS. 2 and 3. The storage disk 22 comprises one or more physical disks 24 which rotate about a central hub 26 as indicated by the arrow 28. Typically, for addressing purposes, the disks 24 are divided into concentric tracks 30 which, in turn, are divided into sectors 32. Any number of vertically aligned tracks 30 form a "cylinder", which is the maximum amount of data that can be read without repositioning the heads 34. The disks 24 have a sensible peripheral indicator (not shown) by which the addressing logic contained within the drive assembly 20 can determine the rotational position of the disks 24. Read/write heads 34 are positioned on the end of arms 36 connected to head positioning mechanisms 38 by which the heads 34 can be moved in and out, as indicated by the arrows 39, under the control of the drive assembly 20. To read from or write to a specific location on the disks 24, the correct head 34 is electronically selected and the arms 36 moved in unison to position all the heads 34 radially at the proper cylinder 30. The rotational position of the disks 24 is then monitored until the desired sector 32 for the read or write is under the selected head 34. At that time, the read/write takes place at a speed determined by the rotational speed of the disks 24.

Such disk drives have numerous problems that have been tolerated to date for lack of any improvement being available. For one example, head and magnetic surfacing materials technology has developed such that higher packing densities on the disks 24 are possible. That has permitted more sectors per cylinder and more cylinders per disk. This has provided higher capacities and higher speeds (relatively speaking). In this latter regard, while the electronics and other areas of disk drive technology have grown so as to permit vastly higher transfer rates, the physical rotational aspects have remained fixed so as to create a bottleneck to any meaningful increase in transfer rates. The earliest computers employed rotating drum memories as the main memory of the computer. The outer surface of the drum was coated with magnetic material and the read/write heads were permanently attached adjacent the magnetic surface. Each head represented one track of the drum with each track being divided into sectors. Addressing was by selection of a head (i.e. track) and rotational position. Those early drum memories rotated at 3,600 rpm. Today's "high technology" disk drive still rotate at 3,600 rpm because of physical limitations which are not important to the discussion herein. Since the speed of rotation determines how fast the data can be transferred into or out of the read/write heads 34, it can be appreciated that if the rotational speed cannot increase above 3,600 rpm and bit densities are substantially maximized at their present level, there is not much potential for increasing disk drive transfer rates.

Another limitation relative to prior art disk drives such as represented by the simplified drawings of FIGS. 1-3 is the "seek time" associated with physically moving the arms 36 and heads 34 in and out between selected cylinders. Particularly where movements are between radial extremes (i.e. between locations close adjacent the rotating center and the periphery of the disk), the seek time for movement can be substantial; and, such time is lost time when the disks 24 are rotating beneath the head 34 but no reading or writing can take place. In the presence of repeated read and write requests between radial extremes, there is also the problem of "thrashing"; that is, the arms and heads must be accelerated in one radial direction and then braked only to be accelerated back in the opposite direction and then braked once again. Where the radial distances are great, the repeated starting and stopping creates high detrimental forces on the components accomplishing the moves. This, of course, can lead to shortened life and/or failure of the drive and its components. To the System Control For Disk 14, BUS 12, and CPU 10, "seek time" appears as a wait state where no other useful work can be performed until the disk request is completed. Seek time averages the majority of the entire disk request cycle time, directly degrading the performance of CPU 10. The greater the number of I/O disk requests, the greater the degradation of system performance until an "I/O" or "disk bound" condition is reached, at which point no greater system performance can be achieved.

Yet another detrimental aspect of prior art disk drive technology can best be appreciated with respect to FIG. 4. The consideration here is reliability with a corollary consideration of reconstructability; that is, how do we protect against lost data and can we reconstruct lost data? With respect to the prior art, the answers are "poorly" and "no". FIG. 4 represents four consecutive eight-bit "bytes" in storage on a typical prior art disk 24. The bytes were written and are read sequentially in the form of sectors (i.e. blocks of data commonly 256, 512, 1024 or 2048 bytes long) from the top to the bottom in the direction of the arrow as the figure is viewed. Thus, the first byte is the binary number 10101010 while the last byte depicted is 11111111. To "protect" against error from a dropped or added bit during read or write, however, the prior art developed and has continued to employ a so-called "parity" bit (designated as bit position "P" in the figure) with each data entity, i.e., byte, nibble, etc., in storage. Parity schemes can be either "even" or "odd". The scheme depicted is an even parity system where the sum of the bits comprising the byte plus the parity bit must always be even in number. In the first byte (10101010) the number of "1"s is four, i.e. an even number. Thus, the parity bit is "0". When the first byte is read, the hardware sums the bits (including the parity bit) and if the sum is even, there is no error. If a "1" bit is lost or added, the sum will be odd and a "parity error" condition will exist. Since the bit position of the bit in error is not known, however, there is insufficient information to accomplish any corrective action. Additionally, as data is transferred there is a cyclic redundancy code (CRC) associated with each serially transferred sector of data. The CRC for each sector of data is checked and a sector integrity error condition exists if the CRC test fails. With the above-described parity error within the sector, the CRC test of sector integrity will fail. Typically in such instances, the only "corrective" action taken is to repeat the read or write "n" (a pre-established value in the system) times to see if the CRC error was a transient. If the CRC error persists, the only action possible is to print an error message to the human operator asking for instructions as to how to proceed such as (DISK READ ERROR, RETRY-CONTINUE-ABORT?). Where it is desired and/or necessary to be able to reconstruct lost data, the prior art has relied upon costly and time consuming approaches like redundant disks and "backing up" or copying of the data and programs on the disk to another disk, tape, or the like. In a redundant disk system, everything is duplicated dynamically with the intention that if one disk has an error, the data will still be available on the "duplicate" disk. Disregarding the cost factor, that philosophy is all well and good until a transient voltage spike (a common source of disk errors) causes the same erroneous data to be written on both disks simultaneously. Backup systems have been used from the very beginning of computer usage. Early systems did their backing up by punching out the data in memory on punched paper tape on a Teletype ® machine (a very time consuming project). More contemporary backup systems typically employ some sort of magnetic tape or disk technology for the storage of the data being backed up. Even so, the process is still costly and time consuming, and loses any data lost between the time of last backup and the time of the failure.

With respect to the prior art of controllers and storage devices, it should also be noted that all controllers are hardwired with respect to an associated storage device. If the size of the storage device is fixed, the controller associated with it has the size fixed in its internal logic. If the size of the storage device can vary within fixed limits and size increments, at best, the controller is able to query the storage device as to which model it is and select from pre-established sizes in its internal logic for the various models. There is no ability to automatically adapt to another size or kind of storage device other than that for which the controller was designed and constructed. If the user wants to get a new kind and/or size of device, a new controller must be obtained as well. Likewise, on the user interface side, if a new interface convention is adopted, the controller must be replaced by one having the proper interface. The same thing takes place on the storage device side—a new interface convention means a totally new controller.

With respect to the seek time problem, there has been some minor recognition of seek time as a degrader of system performance and even less attempt to provide some sort of correction to the problem. This is because the attempts have been made within the prior art controller/storage device manner of construction and operation as described above. Thus, the only commercially viable attempt at such seek time reduction has been the interposing of "round robin"-based optimization hardware between the user CPU and a plurality of controllers connected to individual disk drives. Upon issuing read and write requests to the various controllers, the optimizing hardware thereafter sequentially queries the controllers to see if they are done yet. If not, the hardware moves on to the next and the next until it finds one that is complete and handles that request. This is better than handling the requests on a first in, first out (FIFO) basis as in the balance of the prior art, but far from optimum. Within the confines of the mode of operation of prior art controllers and storage devices, however, it is probably the best that can be hoped for.

Within the past few years, solely in recognition of the transfer rate bottleneck of serial disk drives (i.e. actually discounting the drawbacks to performance of seek time), some initial work has been done with parallel transfer drives (PTDs). The technology appears to be virtually all Japanese in origin and, contrary to the findings of the applicant herein, assumes that seek time is irrelevant to the data transfer rate problem. The present state of PTD development is reported in an article entitled "The bottleneck in many applications created by serial channel disk drives is overcome with PTDs, but the price/Mbyte is high and the technology is still being refined" by Michael Gamerl of Fujitsu America Inc., which appears beginning at page 41 of the Feb.

1987 issue of *HARDCOPY* magazine. Generally, according to that article, the approach employed with PTDs as developed to date is the employing of multiple read/write heads moved in unison on arms with the data written in parallel to multiple magnetic disks which are mechanically or electronically linked to spin actually or virtually in unison. As with so-called "dumb terminals", which include little or no decision-making capability, prior art PTDs could be classified as "dumb disks" in that the only logic provided generally is in the form of a FIFO buffer with associated logic (i.e., "de-skewing circuitry") employed in the path for the transfer of the data to compensate for slight differences in parts alignment and, therefore, latency of data transfer bit positions in the time domain. While some PTD developers advocate providing "intelligence", it appears that what they consider intelligence is only part of the user interface and actually degrades performance potential. As stated in the article, "To support each PTD arm separately, drive hardware is duplicated for each. Otherwise, the structure of a PTD is similar to high performance serial drives." No mention is made of providing for self-checking and correction of transferred data, or the like. No mention is made of providing for interface independence—either on the user or storage device side. Optimization of seek time is not only not mentioned, but actually discounted.

Finally, the concept of "fault tolerance" and the inability of prior art storage device systems to achieve that goal should be addressed. A recent article on fault tolerant computer systems described a fault tolerant system as "a system in which no single failure will be functionally apparent to the user. In other words, fault tolerance means that a system will continue to process even when a component has failed." There are five characteristics required for fault tolerance—Redundancy, Detection, Isolation, Reconfiguration, and Repair. First, every element of the system must have a backup, so that if a component fails, there is another to assume its responsibilities. Second, a fault must be detectable by the system so that the fault can be identified and then repaired. Third, the failed component must be isolated from the rest of the system so the failure of one component will not adversely affect any other component. Fourth, the system must be able to reconfigure itself to eliminate effects from the failed component and to continue operation despite the failure. Finally, when repaired, the failed component must be brought back into service without causing any interruption in processing. With regard to present storage systems, the concept of fault tolerance simply does not exist. None of the five above-enumerated characteristics are met. As described above, in a typical prior art disk storage system, a CRC error which is not a transient and therefore correctable by a reperformance of the operation results in a very apparent inability of the system to continue.

Wherefore, it is the principle object of the present invention to provide a new approach to controllers and associated storage devices such as disk drives, and the like, which provides the benefits of parallel operation employing a plurality of individual devices operating in an intelligent environment making optimum use of their capabilities through the reduction of seek time, and the like.

It is another object of the present invention to provide high capacity without the need to employ more exotic and high priced storage technologies.

It is yet another object of the present invention to provide fault tolerance, high reliability, and the ability to reconstruct lost data simply and easily.

It is still another object of the present invention to provide a ne approach to storage system technology which dramatically reduces, and in some cases eliminates, the necessity for backing up the mass data storage system.

It is yet a further object of the present invention to permit vast increases in the transfer rates for data to and from a storage device beyond the limits normally imposed by speeds of rotation and seek times.

It is another object of the present invention to provide a here- to-fore non-existent device to be interposed between conventional computer storage device controllers and conventional storage devices which provides interface transparency on both sides and a communications and operation intelligence between the conventional devices.

Other objects and benefits of the present invention will become apparent from the detailed description with accompanying figures contained hereinafter.

SUMMARY:

The foregoing objects have been achieved by the storage device and control system of the present invention which has the ability to:

- reconstruct lost data through the use of one extra storage device containing error/recovery code bits;
- have a single controller concurrently read and write to multiple storage devices;
- easily change interfaces with the user and/or the employed storage devices;
- simultaneously employ multiple interface conventions with the user and/or the employed storage devices;
- quickly and easily adapt to various storage device types including the simultaneous concurrent use of different storage device types;
- emulate another storage device for user transparency and convenience; and,
- adapt to various size devices.

More particularly, the foregoing objects have been realized by the storage device system of the present invention which is capable of dynamically and transparently reconstructing lost data and which comprises a plurality of first individual storage devices for storing digital information and a second individual storage device for storing error/recovery code bits. Means are provided for generating and storing error/recovery code bits in the second individual storage device according to a pre-defined parity checking algorithm for the digital information at corresponding respective bit positions across the plurality of first individual storage devices. Additionally, means are provided for using the error/recovery code bits in combination with the contents of the corresponding respective bit positions across the plurality of first individual storage devices to reconstruct a changed bit in error in the digital information according to the parity checking algorithm when one of the first and second individual storage devices detects an error during the transfer of the digital information.

To further achieve the objects, interface means are disposed to receive read and write requests from a user CPU and a plurality of storage device controller means are connected between the interface means and respective ones of the plurality of storage devices for interfacing with the plurality of storage devices and operating them concurrently. Further, the interface means includes interface definition means for accepting requests from a user CPU according to a first interface convention and for translating the requests into a second interface convention used by the storage device controller means for interfacing with the plurality of storage devices. Additionally, the interface means includes a control portion having CPU means operably connected to the plurality of storage device controllers for controlling the sequence of operation of the storage device controllers in writing data to and reading data from the storage devices.

Additionally in the preferred embodiment, a plurality of data buffers are connected to respective ones of the plurality of storage devices from which data is written and into which data is read with respect to the associated the storage device; there is a buffer memory into which data to be written to all the storage devices is placed prior to being transferred to a the data buffer for transferring the data to a the associated storage device; and the CPU means includes logic for immediately acknowledging a write to the associated storage device upon the data being placed in the buffer memory. Also, the CPU means includes logic for checking data in the buffer memory and indicating it as having been read from an associated storage device without an actual read thereof when a read request therefor is received from a user whereby the buffer memory acts as a cache memory in such cases.

DESCRIPTION OF THE DRAWINGS:

FIG. 1 is a simplified drawing of a prior art disk drive system and its manner of interfacing with a user CPU.

FIG. 2 is a simplified plan view drawing of the disk and head positioning system employed in the prior art disk drive system of FIG. 1.

FIG. 3 is a simplified side view drawing of the disk and head positioning system employed in the prior art disk drive system of FIG. 1.

FIG. 4 is a drawing showing the prior art method of parity checking employed in apparatus such as that of FIGS. 1–3.

FIG. 5 is a simplified block diagram of the intelligent disk drive system of the present invention.

FIG. 6 is a simplified drawing showing the basic structure of the virtual disk controller employed in the present invention.

FIG. 7 is a simplified drawing showing data storage across a plurality of disk drive units according to on embodiment of the present invention and corresponding to the data stored in FIG. 4 for comparison purposes.

FIG. 8 is a simplified drawing showing how the individual disk drives transfer the data of FIG. 7 into a buffer for subsequent access by the user as contiguous bits comprising sequential bytes.

FIG. 9 is a simplified drawing showing how the individual disk drives asynchronously transfer the data of FIG. 10 into separate buffers for subsequent access by the user.

FIG. 10 is a simplified drawing showing data storage across a plurality of disk drive units according to a second embodiment of the present invention and again corresponding to the data stored in FIG. 4 for comparison purposes.

FIG. 12 is a simplified drawing showing the prior art effect of a sequence of commands requiring movement to different cylinders on a single disk.

FIG. 13 is a simplified drawing showing the present invention as employed in an embodiment where the disks comprising the virtual disk are cylinder oriented and the beneficial effect to users realized thereby.

FIG. 14 is a block diagram showing how the battery backed up asynchronous que memory of the present invention through which data is transferred to the actual disk drives acts as a cache memory to improve speed of operation in many applications.

Figure 11:
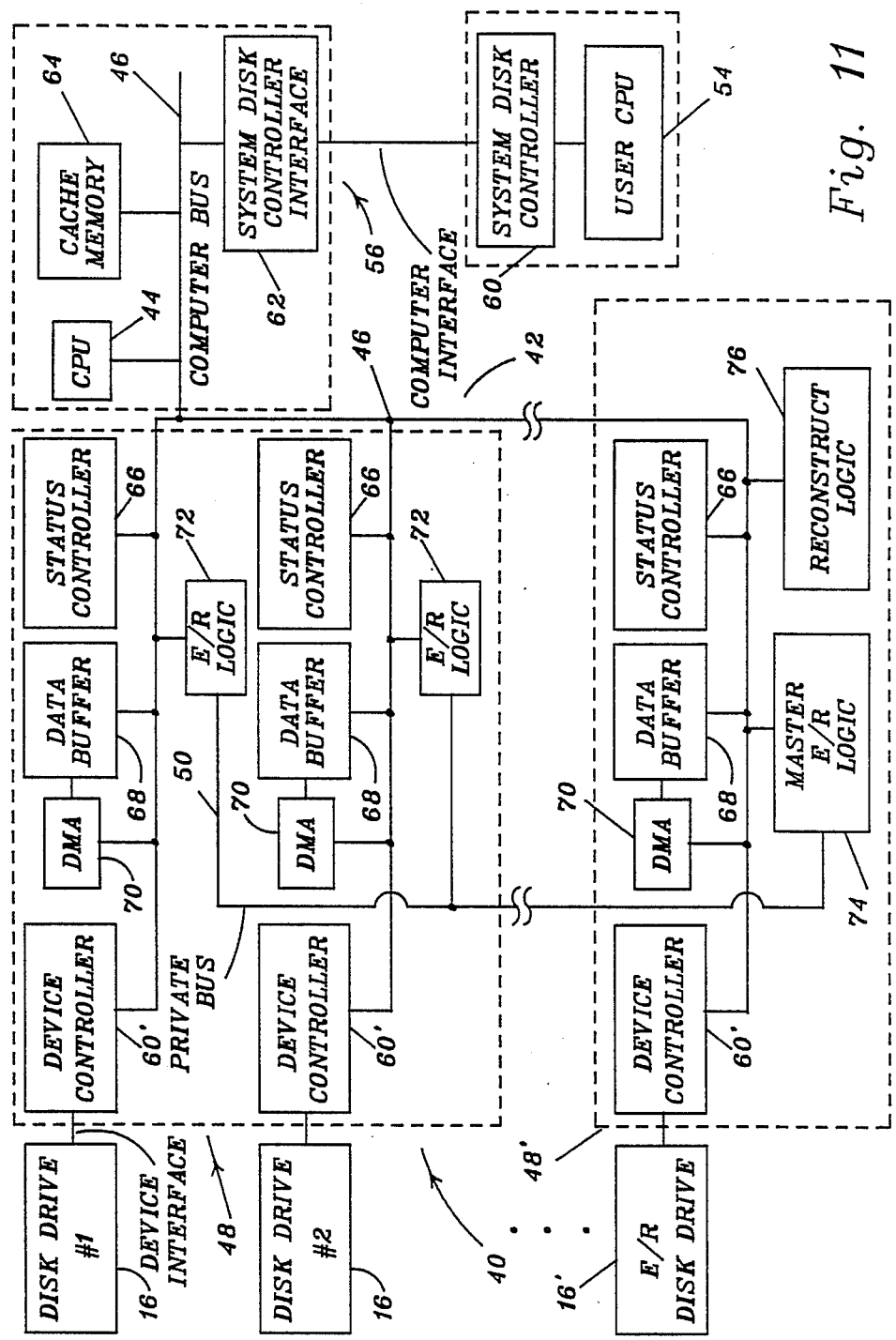
FIG. 11 is a more detailed block diagram of a virtual disk drive system according to the present invention.

DESCRIPTION OF THE PREFERRED EMBODIMENT:

The present invention is based on the proposition of replacing the single prior art disk drive with a virtual disk drive comprised of a plurality of individual and separate conventional prior art disk drives for the data and one additional disk dedicated to the containing of error recover code (ERC) bits associated with the data wherein the plurality of disk drives operate concurrently and intelligently in parallel. As will be developed in detail shortly, it should be readily apparent that such a hither-to untried approach should provide the basis for all the above-enumerated objects of the present invention. Obviously, the capacity of the virtual disk is "n" times that o its individual disks, thus achieving the object of increased capacity. Even employing the same rotational speeds within the individual disk drives at their fixed transfer rates, the virtual disk, operating in parallel instead of serially, should be able to achieve transfer rates at least seven or eight times that realizable by the individual, serial, and rotationally limited disk drives. With respect to fault tolerance, reliability, and reconstructability, as will appreciated from the description hereinafter, the intelligent virtual disk approach maximizes reliability and provides reconstructability such that frequent backing-up truly can be eliminated as a redundant non-necessity. Moreover, it meets all five of the required characteristics for basic fault tolerance.

The intelligent virtual disk drive of the present invention is generally indicated as 40 in FIG. 5. To the user CPU 10 of FIG. 1, the virtual disk drive 40 of the present invention is "transparent"; that is, it appears to the CPU 10 as any other disk drive, such as prior art disk drive 20. Connection is a simple matter. The I/O cable 18 is simply unplugged from the prior art disk drive 16 of FIG. 1 and plugged into the virtual disk drive 40 of the present invention. That is all that is required. This is an important consideration since, to be truly useful, any device must be "plug compatible" with existing hardware and software if it is to be commercially acceptable. Thus, with the present invention, the CPU 10 still sends its read/write requests to its associated disk controller 14 for interfacing with "disk drive" 40 over I/O cable 18 in its normal and expected manner Within the virtual disk drive 40, however, I/O cable 18 actually interfaces with a CPU-based intelligent interface and control portion 43 connected to the virtual disk controller 42, which is the heart of the present invention. Virtual disk controller 42 is, in turn, connected to use a plurality of individual conventional prior art disk drives 16, 16' such as that of FIG. 1. As those skilled in the art will appreciate, the outputs from and inputs to the virtual disk controller 42 to and from the disk drives 16, 16' must be according to whatever format is presently being employed, which they are, as will be seen shortly. Those skilled in the art will also appreciate that since the disk drives 16 are conventional in nature and the interfaces thereto are also conventional, the disk drives 16, 16' could easily be replaced by bubble memories, or the like, to achieve the non-rotationally based benefits of the present invention such as increased speed, capacity and error protection and reconstructability in conjunction therewith. Moreover, as will be described shortly, the interface definition is separately replaceable so that reconfiguration for changes in the "conventional" interface on either side can be made by merely changing that interface definition. As will be appreciated, this internal reconfigurable interface means that new storage devices can be employed at any time with the user interface remaining constant and unchanged. Thus, the "disk drive" being addressed by the user could, in fact, be a bubble memory or some other storage device. The present invention, therefore, embodies a previously non-existent device interposed between the user and the storage device providing transparency in both directions.

Turning briefly to FIG. 6, the physical structure of the present invention as built by the applicant herein for maximum flexibility and reconfigurability is shown in simplified form. In tested embodiments, the CPU 44 employed to provide the "intelligence" which distinguishes the present invention over the prior art is connected to computer BUS 46. A plurality of cards 48 plugged in the computer BUS 46 contain the logic for interfacing with the CPU 44 and the disk drives 16. Card 48' controls and detects failure of error/recovery disk 16'. These together contain logic and data to correct any failure from drives 16, 16'. The system disk control interface is contained on a separate card 62 so that if conventions relative to the devices employed change, the virtual disk control and interface can be quickly and easily adapted to the new convention. The cards 48, 48' are also separately interconnected by a private BUS 50 so as to be independent of the computer BUS 46.

According to the present invention, data (where the term "data" includes computer programs which, too, are nothing more than binary numbers to the disk drive) can be allocated to the parallel disk drives 16, 16' comprising the virtual disk drive 40 in several ways. As with most aspects of computer technology, there are tradeoffs in the present invention which occur relative to time, space and cost. Each manner of allocation is a separate embodiment of the present invention and provides certain advantages and disadvantages in this regard with respect to the other. Certain applications will best be served by one embodiment while others will operate best with another. Thus, the choice is which will best serve the end application. Several typical embodiments are possible and the characteristics of each will now be described. Those skilled in the art will recognize that other possible configurations for the data beyond those to be described are possible within the scope and spirit of the present invention and, therefore, the specific examples to be described are not intended to be limiting in their effect.

In an actual prior art disk, it is typical that each of the cylinders is divided into a plurality of tracks of a fixed number of sectors. Consider the following data on two commercial disks of 75 and 300 Mbyte capacity designations, respectively:

| Tracks per cylinder | 5 | 19 |
|---|---|---|
| Cylinders | 823 | 823 |
| Sector size | 512 | 512 |
| Sectors per track | 36 | 36 |
| Total storage (Mbytes) | 75.85 | 288.22 |
| Seek average (msec) | 30 | 30 |
| Seek max | 55 | 55 |
| Seek min | 6 | 6 |
| Full rotation time (msec) | 16.66 | 16.66 |
| Data transfer rate | 1.2 M | 1.2 M |

As can be seen, the two disks are virtually identical except for the number of tracks per cylinder. This, however, has important ramifications relative to performance. While it would appear that both disks should operate the same with the only difference being in the total capacity of the larger disk, in actuality, the larger disk performs better than the smaller. The reason is simple, to change cylinders, there must be movement of the arms and read/write heads as previously described. That takes lost time and lost time reduces performance. In the smaller disk, 45 consecutive sectors (5 tracks×9 sectors/track) can be accessed without access-arm movement. By contrast, in the larger disk it is 171 consecutive sectors. Thus, consecutive sectors addressable without access-arm movement (i.e. associated seek time) is a significant measure of performance.

The first embodiment of the present invention relative to data storage is depicted in FIGS. 7 and 8. According to this approach, the eight individual bits comprising each byte are spread across eight individual disks. For ease of comparison and understanding, the data depicted in FIGS. 7 and 8 corresponds to the data used for the example of FIG. 4. As shown in FIG. 7, for example, there are nine disks for the eight data bits and a single error/recovery bit. As with the example of FIG. 4, the data of FIGS. 7 and 8 is written and read from the top down as the figures are viewed. Thus, it can be seen that the error/recovery bit (in this case equal to the parity bit for the same data) and data of the first byte (010101010) in FIG. 4 is the same in this embodiment of the present invention, only spread out across a particular identifiable bit position in the nine disk drives 16, 16' of the virtual disk drive 40 as 0-1-0-1-0-1-0-1-0. As represented by the drawing of FIG. 8, in this embodiment, the data from each of the disk drives 16, 16' is asynchronously written into and read out of a buffer 52 as individual bit streams into and out of the bit positions of the sequential bytes. The user 54 interfaces with the buffer 52 and is completely unaware of the asynchronous nature of the data transfer which takes place with respect to the buffer 52 and the disk drives 16, 16' comprising the virtual disk drive 40. In this embodiment, maximum speed is sacrificed for simplicity of control logic and lower cost. This embodiment also provides the ability to reconstruct erroneous data "on-the-fly"; that is, while data is being transferred, a lost or added bit within a byte can be found and corrected. Not only that, such dynamic failure reconstruction can be continuous in nature from byte to consecutive byte. What that means is that one disk drive 16, 16' can completely fail (or be removed for maintenance) and the virtual disk drive system of the present invention will continue in operation uninterrupted with virtually no loss of performance. Once the removed disk drive 16 is re-established in the system, the data contained on it will be automatically restored dynamically during use according to the same process. The way this works employing prior art disk drives which could not individually accomplish the same thing can be understood by comparing FIGS. 3 and 4 to FIG. 5. In prior art disk drive 16 containing the data of FIG. 4, if the first byte (010101010) drops a bit and now contains 010101000, the three "1" bits are odd in number and a parity error within the first byte will cause a CRC error in the sector integrity. The logic, however, does not know which bit position is involved and cannot take corrective action. Consider the same failure in the virtual disk drive 40 as depicted in FIG. 7. The data within "Disk 2" representing the bit stream of bit 2 is still maintained in eight bit bytes with an associated parity bit since it is a "standard" prior art disk drive. Thus, the reconstruction logic of the present invention is informed of two facts. First, that Disk 2 had a CRC error in reading the sector which contained the bit 2 bit for the first byte, i.e. that it is the Disk 2 bit position (i.e. bit 2) which is in error. Second, that the error/recovery bit test across the first byte (010101010) is in error (since 010101000 was read). Since bit 2 of the first byte is reading as a "0" and is in error, in a binary system it can only correctly be a "1". By making that correction, the erroneous first byte is dynamically corrected from 010101000 to 010101010. In actual practice, this is accomplished by simply logically XORing the contents of the bit position and its corresponding error/recovery bit together in a manner well known in the art. Note that if it is the error/recovery bit drive, i.e. Disk E/R, which fails, the correction takes place in the same manner.

The second embodiment of the present invention to be described is based on the principle of performance maximization, i.e. reduction of seek time, etc. What is sacrificed is simplicity of control logic. The trade-off is not hard to justify, however. Complexity of the logic within the virtual disk controller 42 of the present invention is a small consideration which is of no importance to the end user whatsoever and of manageable impact on the overall cost of producing a commercial system. On the other hand, day to day performance is a continuous thing of direct relevance to the end user.

The second embodiment and its manner of operation is shown in FIGS. 9 and 10. As shown in FIG. 10, the data in this embodiment is distributed on the disks on a designated sector per disk drive basis. For purposes of example, the first byte of the contents of the three sectors 2, 6, and 8 are shown in FIG. 10 as being contained on Disks 2, 6, and 8. To prevent confusion, the data contents of the remaining disks are undesignated. As the figure is viewed, the first byte of sector 2 is 11111111, the first byte of sector 6 is 00000010, and the first byte of sector 9 is 10101010. As shown in FIG. 9, the advantage of this embodiment is that the nine disk drives 16, 16' corresponding to sectors 1-8 plus error/recovery across the drives 16, 16' can transfer data into and out of separate buffers 52 asynchronously and simultaneously.

As can be appreciated, the contents and manipulation of the error/recovery disk (Disk E/R) 16' is somewhat more complex in this embodiment, particularly when an error is discovered. Error/recovery across the disk drives 16, 16' comprising the virtual disk drive 40 in this embodiment is on a sector by sector basis. The only time that the error/recovery disk 16' may need to be updated is when a write to one of the disks takes place. To this end, as will be described in greater detail shortly, the logic of the present invention accomplishing the transfer of data to an individual disk drive 16 checks the status of the bits looking for bits that have changed (i.e. from "1" to "0" and vice versa). Only when a bit position has changed does the corresponding bit on the error/recovery disk 16' have to be changed. That change is made as a separate write to the error/recovery disk 16' which occurs before any other changes to the data disks 16 can take place which would affect the error/recovery disk 16' in that area.

To reconstruct lost data in this embodiment, of course, the data for the sectors and the corresponding error/recovery data from Disk E/R which include the "lost" data must be brought into a common buffer area so that the across-the-drives error/recovery correction procedure described above with respect to the previous embodiment can be accomplished. Obviously, this is a more complex and time consuming procedure; but, statistically, will occur very rarely. In the event of a complete disk drive removal or failure, in this embodiment there would be a significant reduction in performance while continual reconstruction and correction in the above-described manner was taking place; however, as with the previous embodiment, there would be no actual "crash" of the virtual disk drive 40 and computation would continue, albeit in a somewhat degraded performance mode—which is certainly better than in the prior art where a crash results in no performance whatsoever A third possible embodiment for the assignment and storage of data is shown in simplified form with reference to FIGS. 12 and 13. In this case, it is assumed that the application is heavily cylinder oriented. To maximize performance and reduce seek time, the disks 16 comprising the virtual disk 40 are assigned and the data allocated on a "cylinder" basis. To see the effect of this data and address structuring within the overall environment of the present invention, reference should first be made to FIG. 12 wherein a prior art single disk is shown along with the effect of a simple typical sequence of commands by a plurality of users. As can be seen, the various cylinders (i.e. C1, C2... Cn) are located radially on the disk 16. For simplicity, only one disk and head assembly are shown for each of the disks 16 whereas it is understood that, in actuality, the disks 16 in FIGS. 12 and 13 contain multiple disks as in FIG. 3. As each user does a read or write to his various cylinder (remembering that the users are cylinder oriented), the heads must move in and out to be positioned vertically at the desired cylinder. Accordingly, each user must wait until the preceeding command has been accomplished, i.e. first in, first out. In the embodiment of the present invention of FIG. 13, each disk 16 is identified with an individual cylinder. Thus, the users are able to concurrently access their individual "cylinders". Moreover, as depicted in the figure, a user making sequential read requests to data previously read has no seek time whatsoever with the present invention since the data previously read will be retained in cache memory and, therefore, be instantly available without rereading from disk in a manner to be described in more detail shortly. This is an important distinction of the present invention over the prior art. As will be remembered from the discussion of round robin "optimization" discussed under Background of the Invention, sequentially doing a query of the status of several disk drives is the best that the prior art can accomplish given its "dumb" drive status. Such is not the case with the intelligent storage system of the present invention. The logic knows were each disk 16, 16' has the heads thereof positioned as a result of the last read or write request thereto. They are dynamically changing values maintained by the logic of the CPU for this very purpose. Thus, in the present invention, seek time can be minimized because the logic can keep the drives 16, 16' working in an optimal manner as, for example, by giving priority to requests that require the minimum movement of each drive.

Having now described several embodiments of the present invention as they relate to the manner and mode of data storage across a plurality of conventional disk drives comprising a virtual disk drive, the construction of the virtual disk drive controller of the present invention and its preferred manner of operation to achieve additional benefits over and above those enumerated above will now be addressed.

Turning first to FIG. 11, the virtual disk drive controller 42 of the present invention as configured to accomplish the second embodiment as described above (i.e. sector-assigned disks) is seen as comprising a interface and control portion 56 connected via the computer BUS 46 to a plurality of disk drive interfacing portions 48. The dotted line in the figure stands for the proposition that in the tested embodiment of the applicant, two interfacing portions 48 are contained on a single card. The standard interface presently employed by disk drives and disk drive controllers is the so-called "SCSI" interface. As can be seen, to be compatible with the user 54 and its system disk controller 60 on the one hand and the standard disk drives 16 employed in the virtual disk drive 40 on the other hand, the interface and control portion 43 includes a system disk controller interface 62 which presents the proper interface to the system disk controller 60 while the disk drive interfacing portions each terminate in a device controller 60' which presents the proper device interface to the disk drives 16 connected thereto. The type of interface employed is not considered to be a feature of the present invention. The ability to employ any type of interface and the ability to easily reconfigure to a new interface, however, are considered as important features and points of novelty of the present invention over the prior art. Control of the virtual disk drive controller 42 is accomplished by the programming logic contained within the CPU 44. As those skilled in the art will appreciate, it is preferred that the programming logic performed by the CPU be in the form of firmware residing in read only memory (ROM) but that other methods of accomplishment could be employed if desired. The interface and control portion 56 also includes what is, because of special use made thereof to be described shortly, designated as "cache memory" 64.

Each of the disk drive interfacing portions 48 have a status controller 66 connected to the computer bus 46. The device controller 60' previously mentioned is connected between its associated disk drive 16 and the computer BUS 46. Also connected to the computer BUS 46, in each case, is a data buffer 68 controlled by a DMA 70. These elements operate in a manner well known in the art and, therefore, no additional description thereof will be provided in the interest of simplicity. There is also error/recovery logic 72 associated with each disk drive interfacing portion 48. It is this logic which, as previously mentioned, checks the bits of data being written to the disk for changes by XORing it with the prior data. When changes are found, this information is forwarded to the master error/recovery logic 74.

Error/recovery bit generation across the individual disk drive interfacing portions 48 according to the algorithm being employed is contained in the master error/recovery logic 74 which interfaces back to each of the error/recovery logic blocks 72 through a private BUS 50 as well as to the controller 60' and associated components for the error/recovery drive 16' to cause update thereof when necessary due to a change in the contents of a bit position requiring changing of the corresponding error/recovery bit on the error/recovery drive 16'. Reconstruct logic 76 is connected to the computer BUS 46 and, therefore, can communicate with the master error/recovery logic 74 as well as with all the other error/recovery logic blocks 72 and the other system component. As will be appreciated by those skilled in the art without necessity for a further detailed description, the reconstruct logic 76 has access to all the information necessary to accomplish reconfiguration of lost data. As mentioned earlier, this is accomplished in the manner suited to the embodiment for data storage being implemented. For example, in the case of sector data orientation across the disk drives 16, 16', in the event of lost data being detected, the reconstruct logic would have to read the sectors including the lost data from the various drives 16, 16', sense the drive error signal from the status controllers 66 appearing on the computer BUS 46 to determine which drive 16, 16' contains the data in error, and then XOR the data from the bad drive with the error/recovery bits to assure proper reconstruction of lost data, and then present the reconstructed data to the CPU 44 for use. Note that, as mentioned before, provision is made for recognizing and correcting the error/recovery drive 16' if it is bad, just as with any of the other drives 16. It will be appreciated that simultaneous multiple error detection and correction can be accommodated with additional error correction drives.

Turning now to FIG. 14, a final, yet major, aspect of the present invention will now be discussed. The actual writing into and reading from the individual disk drives 16, 16' is via the individual data buffers 68. Cache memory 64 is a large (i.e. 3.6 Mbytes in a tested embodiment) memory used for the storage of data going to and coming from the user CPU 54. It is into the memory 64 that asynchronously read sector data is moved when the virtual disk drive 40 is operating in the manner as described with respect to FIGS. 9 and 10. In this regard, memory 64 is an asynchronous que for the movement of data to and from the disk drives 16. To maximize the performance increases possible with the present invention, when the user CPU 54 presents a block of data to be written to "disk" (i.e. the virtual disk drive 40 which is transparent to him), the data is moved into an available area of the memory 64 and an immediate acknowledgment made to the user CPU 54. Thus, the user CPU believes that the requested disk write has been accomplished. The actual write to the appropriate disk drive 16 for the sector involved takes place whenever possible thereafter. The logic of the CPU 44 in the interface and control portion 56 asynchronously writes from the memory 64 into the appropriate data buffer 68 when it is next available for a write to disk. In this regard, the logic maximizes the transfers out of the memory 64 without regard to traditional FIFO or LIFO procedures. Rather, it attempts to keep disk transfers maximized by writing out the best data for minimizing seek times and employing disk drives which would otherwise be idle.

In many data base operations, for example, it is quite common to write to disk and then almost immediate re-access the same data. In such cases, the present invention operates memory 64 as a cache memory as depicted in FIG. 14; that is, if a read request is made for data already queued within memory 64 to be written to disk, the actual read request is aborted and the data is presented back to the requestor as having just been read from disk in response to the request. As should be readily apparent to those skilled in the art, without more, the use of the large asynchronous queing memory 64 would be at odds with the reliability aspects of the present invention. Thus, one cost factor which must be absorbed to fully realize the benefits of the present invention is the use of a battery backup power supply 78 in conjunction with the memory 64 such that in the event of a power failure, the data contained therein will not be lost. As those skilled in the art will recognize and appreciate, cache memory in and of itself is not new. Cache memory configured as in the present invention and operating in the manner as described herein, however, is believed to be an aspect of the present invention which is novel over the prior art.

Having thus now described several possible data orientations possible with the present invention and the physical structure thereof, the overall manner of operation thereof to maximize performance through the use of intelligence in work allocation will now be addressed with particularity. This is important to a complete understanding and appreciation of the difference between prior art disk drives (including the PTD variety) and the highly intelligent, parallel, virtual disk drive system of the present invention. In this regard, in addition to the fact that a plurality of individual disk drives are employed and the fact that detection and reconfiguration of lost data is possible, the most important factor of the present invention is the incorporation of a microcomputer to intelligently and efficiently optimize all the mechanical movements of the individual drives. As can be appreciated, this is a two edged sword; that is, there must be the individual disk drives with their separately positionable mechanical mechanism and there must be intelligence in the manner in which the drives are positioned. In the present invention, the CPU 44 is able to concurrently allocate the read/write operations to the various disks 16, 16' in the most optimum manner, looking for operations that maximize efficiency. For example, in a conventional disk drive, operations are performed sequentially. By contrast, in the present invention, the intelligence of the logic contained within the CPU 44 is designed to concurrently and asynchronously employ the various drives 16, 16' (and the cache memory 64) to maximize efficiency. For example, if drive "n" is at cylinder 13 and there is a request queued for the same drive at a nearby cylinder, the CPU 44 can be programmed to perform that request prior to one requiring that the arm and head assembly move to a more removed position. Again, the various possibilities for the "intelligence" of the CPU 44 made possible by the unique structure of the virtual disk drive of the present invention providing for true concurrent operation are largely a function of the application to which it is applied. In some applications, for example, sequential operation might be a necessity and the above-described example of taking requests out of turn to take advantage of cylinder positioning might not be desirable.

Wherefore, having thus described our invention, we claim:

1. In a high-capacity, error-correcting virtual disk drive storage device for a computer comprising:
   a single interfacing logic portion for interfacing with a user CPU, the interfacing logic portion including disk drive controller interface means for interfacing with a standard disk drive controller through which the user CPU is connected to the virtual disk drive storage device;
   a plurality of standard disk drives adapted to interface with a standard disk drive controller at an input interface thereof,
   a plurality of disk drive controllers connected between the interfacing logic portion and respective ones of the plurality of disk drives, each of the disk drive controllers including controller interface means for presenting a standard system disk drive controller interface to the input interface of its respective disk drive, a data buffer for transferring data to and from its respective disk drive, and parity generator means for generating a parity bit for standard length groups of bits being transferred to its respective disk drive;
   virtual disk drive parity generation means for generating parity bits associated as part of data groupings of bits being transferred to the disk drives; and,
   reconstruct logic means for sensing a parity error condition from one of the disk drives in combination with a parity error in one of the data groupings of bits as indicated by a parity bit generated by the virtual disk drive parity generation means and for using the knowledge of which of the disk drives' data is in error in combination with the parity bit generated by the virtual disk drive parity generation means to logically reconstruct an erroneous bit creating the joint parity error condition, the improvement for assuring high-speed operation of the virtual disk drive storage device comprising:
   (a) the data buffers in combination comprising FIFO buffer means for holding a plurality of sequential data groupings; and,
   (b) the disk drive controllers each including data transfer logic for transferring respective ones of a sequence of the data groupings from their respective disk drives into said FIFO data buffer means asynchronously and for informing the standard disk drive controller through which the user CPU is connected to the virtual disk drive storage device that a requested read operation is complete only when there are sufficient ones of the sequence of the data groupings being read from all the disk drives to assure that the user CPU cannot remove the sequence of the data groupings being read from all the disk drives from said FIFO data buffer means faster than remaining ones of the sequence of the data groupings being read from all the disk drives are read asynchronously into said FIFO data buffer means.

2. The improvement to a high-capacity, error-correcting virtual disk drive storage device to provide high-speed operation thereof of claim 1 wherein:
   (a) the interfacing logic portion includes a control portion having CPU means operably connected to the plurality of disk drive controllers for controlling the sequence of operation of the disk drive controllers in writing data to and reading data from the disk drives; and additionally comprising:

(b) a buffer memory into which data to be written to all the disk drives is placed prior to being transferred to a data buffer for transferring the data to an associated disk drive; and wherein, (c) said CPU means includes logic for immediately acknowledging a write to the associated disk drive upon data to be written being placed in said buffer memory whereby read throughout of the virtual disk drive storage device is increased.

3. The improvement to a high-capacity, error-correcting virtual disk drive storage device to provide high-speed operation thereof of claim 2 wherein additionally:

said CPU means includes logic for checking data in said buffer memory and indicating it as having been read from an associated disk drive without an actual read thereof when a read request therefor is received from a user whereby said buffer memory also acts as a cache memory in such cases.

4. The improvement to a high-capacity, error-correcting virtual disk drive storage device to provide high-speed operation thereof of claim 1 wherein:

(a) the plurality of disk drive controllers and the interfacing logic portion are interconnected to communicate with one another over a first computer BUS; and, (b) the controller interface means, the data buffers, and parity generator means of the disk drive controllers are interconnected to communicate with one another over a second computer BUS.

5. In a high-capacity, error-correcting virtual disk drive storage device for a computer comprising:

a single interfacing logic portion for interfacing with a user CPU, the interfacing logic portion including disk drive controller interface means for interfacing with a standard disk drive controller through which the user CPU is connected to the virtual disk drive storage device;

a plurality of standard disk drives adapted to interface with a standard disk drive controller at an input interface thereof;

a plurality of disk drive controllers connected between the interfacing logic portion and respective ones of the plurality of disk drives, each of the disk drive controllers including controller interface means for presenting a standard system disk drive controller interface to the input interface of its respective disk drive, a data buffer for transferring data to and from its respective disk drive, and parity generator means for generating a parity bit for standard length groups of bits being transferred to its respective disk drive;

virtual disk drive parity generation means for generating parity bits associated as part of data groupings of bits being transferred to the disk drives; and, reconstruct logic means for sensing a parity error condition from one of the disk drives in combination with a parity error in one of the data groupings of bits as indicated by a parity bit generated by the virtual disk drive parity generation means and for using the knowledge of which of the disk drives' data is in error in combination with the parity bit generated by the virtual disk drive parity generation means to logically reconstruct an erroneous bit creating the joint parity error condition, the improvement for assuring high-speed operation of the virtual disk drive storage device comprising:

(a) the data buffers in combination comprising FIFO buffer means for holding a plurality of sequential data groupings;

(b) the disk drive controllers each including data transfer logic for transferring respective ones of a sequence of the data groupings from their respective disk drives into said FIFO data buffer means asynchronously and for informing the standard disk drive controller through which the user CPU is connected to the virtual disk drive storage device that a requested read operation is complete only when there are sufficient ones of the sequence of the data groupings being read from all the disk drives to assure that the user CPU cannot remove the sequence of the data groupings being read from all the disk drives from said FIFO data buffer means faster than remaining ones of the sequence of the data groupings being read from all the disk drives are read asynchronously into said FIFO data buffer means;

(c) the interfacing logic portion including a control portion having CPU means operably connected to the plurality of disk drive controllers for controlling the sequence of operation of the disk drive controllers in writing data to and reading data from the disk drives; and, (d) a buffer memory into which data to be written to all the disk drives is placed prior to being transferred to a data buffer for transferring the data to an associated disk drive; and wherein additionally, (e) said CPU means includes logic for immediately acknowledging a write to the associated disk drive upon data to be written being placed in said buffer memory whereby read throughput of the virtual disk drive storage device is increased.

6. The improvement to a high-capacity, error-correcting virtual disk drive storage device to provide high-speed operation thereof of claim 5 wherein additionally:

said CPU means includes logic for checking data in said buffer memory and indicating it as having been read from an associated disk drive without an actual read thereof when a read request therefor a received from a user whereby said buffer memory also acts as a cache memory in such cases.

7. The improvement to a high-capacity, error-correcting virtual disk drive storage device to provide high-speed operation thereof of claim 5 wherein:

(a) the plurality of disk drive controllers and the interfacing logic portion are interconnected to communicate with one another over a first computer BUS; and, (b) the controller interface means, the data buffers, and parity generator means of the disk drive controllers are interconnected to communicate with one another over a second computer BUS.

8. In a high-capacity, error-correcting virtual disk drive storage device for a computer comprising:

a single interfacing logic portion for interfacing with a user CPU, the interfacing logic portion including disk drive controller interface means for interfacing with a standard disk drive controller through which the user CPU is connected to the virtual disk drive storage device;

a plurality of standard disk drives adapted to interface with a standard disk drive controller at an input interface thereof;

a plurality of disk drive controllers connected between the interfacing logic portion and respective ones of the plurality of disk drives, each of the disk drive controllers including controller interface means for presenting a standard system disk drive controller interface to the input interface of its respective disk drive, a data buffer for transferring data to and from its respective disk drive, and parity generator means for generating a parity bit for standard length groups of bits being transferred to its respective disk drive;

virtual disk drive parity generation means for generating parity bits associated as part of data groupings of bits being transferred to the disk drives; and, reconstruct logic means for sensing a parity error condition from one of the disk drives in combination with a parity error in one of the data groupings of bits as indicated by a parity bit generated by the virtual disk drive parity generation means and for using the knowledge of which of the disk drives' data is in error in combination with the parity bit generated by the virtual disk drive parity generation means to logically reconstruct an erroneous bit creating the joint parity error condition, the improvement for assuring high-speed operation of the virtual disk drive storage device comprising:

(a) the data buffers in combination comprising FIFO buffer means for holding a plurality of sequential data groupings;

(b) the disk drive controllers each including data transfer logic for transferring respective ones of a sequence of the data groupings from their respective disk drives into said FIFO data buffer means asynchronously and for informing the standard disk drive controller through which the user CPU is connected to the virtual disk drive storage device that a requested read operation is complete only when there are sufficient ones of the sequence of the data groupings being read from all the disk drives to assure that the user CPU cannot remove the sequence of the data groupings being read from all the disk drives from said FIFO data buffer means faster than remaining ones of the sequence of the data groupings being read from all the disk drives are read asynchronously into said FIFO data buffer means;

(c) the interfacing logic portion including a control portion having CPU means operably connected to the plurality of disk drive controllers for controlling the sequence of operation of the disk drive controllers in writing data to and reading data from the disk drives; and, (d) a buffer memory into which data to be written to all the disk drive is placed prior to being transferred to a data buffer for transferring the data to an associated disk drive; and wherein additionally, (e) said CPU means includes logic for immediately acknowledging a write to the associated disk drive upon data to be written being placed in said buffer memory and logic for checking data in said buffer memory and indicating it as having been read from an associated disk drive without an actual read thereof when a read request therefor is received from a user whereby read throughout of the virtual disk drive storage device is increased and said buffer memory also acts as a cache memory.

9. The improvement to a high-capacity, error-correcting virtual disk drive storage device to provide high-speed operation thereof of claim 8 wherein:

(a) the plurality of disk drive controllers and the interfacing logic portion are interconnected to communicate with one another over a first computer BUS; and, (b) the controller interface means, the data buffers, and parity generator means of the disk drive controllers are interconnected to communicate with one another over a second computer BUS.

* * * * *